United States Patent [19]

Zveibil

[11] Patent Number: 4,977,713
[45] Date of Patent: Dec. 18, 1990

[54] CONVERTIBLE AND REVERSIBLE SOLAR SHED OR CEILING

[76] Inventor: Salvador M. Zveibil, R. Tomé Portes, 1256, Sao Paulo, Brazil, 04623

[21] Appl. No.: 386,573

[22] Filed: Jul. 28, 1989

[30] Foreign Application Priority Data

Aug. 3, 1988 [BR] Brazil ................................ 8804046

[51] Int. Cl.$^5$ ............................................. E04B 1/346
[52] U.S. Cl. ........................................... 52/65; 52/66; 52/69; 47/17
[58] Field of Search ................ 52/65, 66, 69; 47/28.1, 47/17

[56] References Cited

U.S. PATENT DOCUMENTS

| | | | |
|---|---|---|---|
| 2,544,500 | 3/1951 | Jacobi | 52/65 X |
| 3,516,472 | 6/1970 | Zveibil | 52/75 X |
| 3,919,814 | 11/1975 | Beretta et al. | 52/473 X |
| 4,128,307 | 12/1978 | Badertscher et al. | 52/64 X |
| 4,587,775 | 5/1986 | Lewis et al. | 52/66 X |

Primary Examiner—David A. Scherbel
Assistant Examiner—Linda J. Hoffert

[57] ABSTRACT

The present invention comprises essentially two parallel and aligned ranks of compound plates (1) which are pivoting and rotating around preferably vertical cylindrical bearings (2), the plates being rectangular in plane view but having a profile which may be rectilinear, polygonal or arcuated, the plates (1) being placed two by two in face to face relationship and at uniform spacements so as to fully cover the gap (or partially cover the gap), each rank of plates being controlled or coordinated by one rack device or by combined levers which similtaneously actuate the plates to turn at 0° or 180° in each rank; rotation at 0° being possible as the plates are in face to face relationship causing closure of the gap and touching themselves by their upper ends, that is closing the coverage and fully covering the area; rotation at 90° being possible as the plates are parallel to the longitudinal direction of the rank, forming two vertivcal walls of plates (1); and rotation at 190° being possible as the plates are in opposition and thus completely opening the coverage and fully releasing the area to the sun and to the wind; between 0° and 180° the plates may be placed at any intermediary position, and each rank of plates having its collective control and if necessary, both controls may be coordinated in a single one which may be manually or motor-driven, and then achieving the consequent instantaneous response.

6 Claims, 6 Drawing Sheets

CONVERTIBLE AND REVERSIBLE SOLAR SHED OR CEILING

It is known that the existence of a number of different products or applications of the most varied nature require controlled protection with respect to several external or natural agents such as: wind, rain, cold, frost and sun severities, as well as against a plurality of other agents which are generally present in the environment or the so-called inclemencies.

Depending upon their stage or phase of maturation or growth a number of different agricultural cultures at open sky require protection against harsh sunlight, continuous rain, or any other agent of the Nature.

It is rather common to find situations where the lack of the above-mentioned protection causes damage to the whole culture or plantation of determined products thereby jeopardizing or even resulting in complete lost of the production, and thus creating serious consequences not only to the producer, but also to the consumers.

Another example of such a situation is with coffee or grain drying yards where the grains remain dispersed on the floor under the direct exposure to the sun. Eventually but not so seldomly a sudden rain may occur and the product must be immediately collected or covered by canvas or similar plastic tissues.

Naturally such coffee or grain drying areas are of a large size, and the collection or coverage operations usually requires a relatively long period of time to be completed, thus causing damages to the quality of the grains.

Hothouses for orchids, other kinds of storages for ornamental plants and vivariums in general would also require identical protection. However in such cases a perfect control of the mentioned protection becomes necessary and important so as to develop or to discontinue or even diminish the protection when desired or deemed convenient.

Further with reagard to the agricultural products, animals would also need a similar protection as their usual confinement to specific fenced pastures such as chicken coops, corrals and the like are generally under an opened sky, thereby preventing the animals from searching by themselves for the necessary protection against the rain, sun severity, excessive wind etc. If the animals are confined to closed places the sun cannot reach the interior of the place and then it becomes humid and infected (the sun is the most powerful, efficient and inexpensive disinfectant).

In addition to the above, the present invention has also application to areas which are normally uncovered and destined to sporting and leisure activities, such as pools, tennis and basketball courts etc., which cannot be used under unfavourable conditions of the weather, that is under rain or excessive wind.

Naturally in order to meet the objectives of protection mentioned above, there already exist some types and models of coverages, sheds and similar. Some of them are fixed and permanent and others are demountable.

The fixed types generally involve a constructive complexity, high cost in installation and maintenance, as well as they usually fail to provide means of obtaining the desired control over their own performance. The demountable coverages usually fail to provide efficient use and also involve a lot of work, time and labour to have them mounted and dismounted everytime it is necessary.

Classical agricultural sheds for instance, generally called green houses usually comprise wood or metallic structures which form an angular or arcuated framework having thereover canvas or plastic films with diverse textures, durability, opacity or transparence. Said covering materials usually have a relatively short period of duration.

The referred to plastic films or canvas are fastened to the structure by any means, and therefore the assembly remains fixed and the shed closed. Frequently, the use of thin plastic sheets is preferred and such have a very short duration, and thus they have to be replaced every six-month or one-year period. In case of violent rain or wind able to cause total or partial prejudices to the coverage, said thin plastic sheet must be replaced earlier.

Generally the classical hothouses are destined to protect plants and others, but usually create a suffocating atmosphere which leads the user to utilize artificial resources or means, such as hygroscopic air conditioners or the like which are expensive and of a low efficiency. Such artificial means are used to substitute the ideal conditions of growth and protection or involve a complex and expensive system to open and close windows or small sectors thereby requiring so much work and labour to the installation, maintenance and control of the mechanisms.

In view of the foregoing and with the objective of overcoming the above-mentioned disadvantages of the conventional coverages, the convertible and reversible storage shed or solar ceiling of the present invention has been designed with extremely simple characteristics and with a conceptive inventiveness capable of offering conditions of use which have not yet been found in any other known device or installation of this kind.

By means of a mechanical device for the instantaneous opening, the present invention provides free exposure of the internal area to the Nature and its agents, such as: air, sun, pollen, bees and other beneficial natural agents and then respecting the local ecology. On the other hand, when desired and/or deemed convenient the same mechanical device may cause the instantaneous and full closure of the coverage.

From an essential point of view the storage shed or ceiling of the present invention comprises large rotating and coordinating plates which will hereinafter be described in detail, and which provide completely new features to the invention as follows:

full protection similar to or better than that provided by closed sheds;

movement of the component plates so as to expose completely or in part the protected area to the Nature and at the degree the user deems convenient;

movable plates having independent construction and for this reason capable of having replaced only that or those plates which eventually become damaged by violent rains or froze. This feature is new over the conventional sheds formed by continuous sheets wherein the whole cover must be replaced in case of need;

controlled opening of the coverage to the sun and inclemencies allowing the right protection at the right time, and then having the Nature as a controlled colaborator to protect the plantation, the animals, the sport practicing, the harversting etc. from the excesses and violences.

The storage shed or solar ceiling of the present invention is in summary and nothing more than a large "umbrella" which may be open or closed when desired.

The most important is that the present invention shows a great versatility of use, and as such same is recommended to a number of different controlled protection needs and having if needed an instantaneous response (ten seconds).

Drawings attached hereto illustrate the invention as follows.

Figures 1, 2, 3:
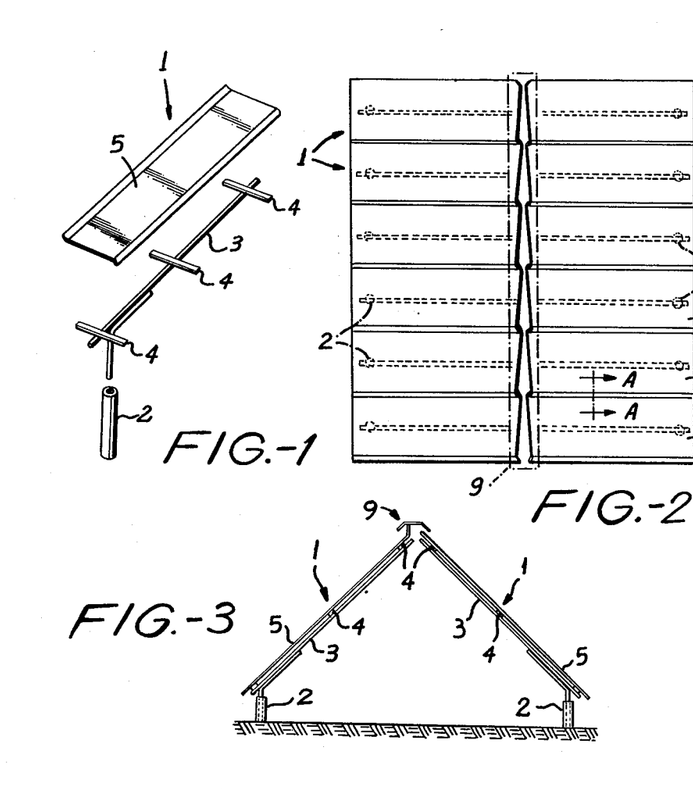
FIG. 1 is a perspective view of the set of components forming part of the pivoting element which constitutes the convertible and reversible solar shed or ceiling of the present invention.
FIG. 2 is a plant view of the convertible and reversible solar shed or ceiling of the present invention formed by elements of FIG. 1 at the fully closed position of the respective gap.
FIG. 3 is a frontal view of the same convertible and reversible solar shed of FIG. 2 still under the fully closed position of the gap.
Figure 11:
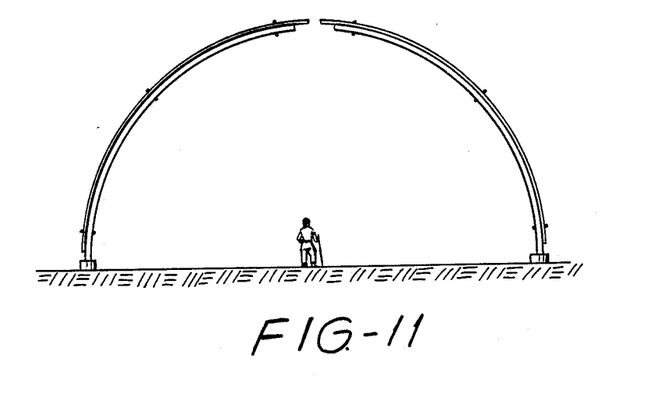
FIG. 11 is a frontal view of said convertible and reversible solar shed or ceiling constituted by the elements of FIG. 10 and under the full closed position of the gap.
Figure 12:
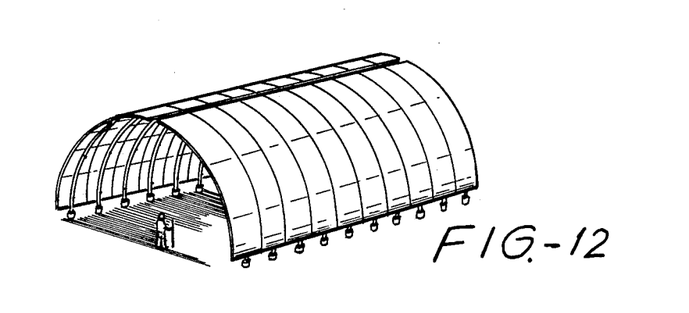
FIG. 12 is a perspective view of said solar shed or ceiling of FIG. 11 still under the full closed position of the gap.
Figure 17:
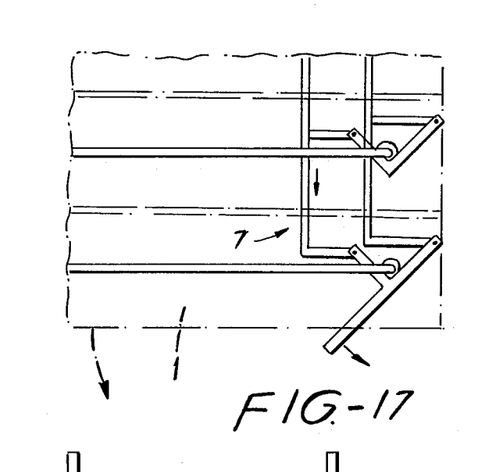
FIGS. 17 and 18 show an example of a possible configuration of the instantaneous transmission of movements of the components of one side of the shed by means of joint action of bars.
Figure 18:
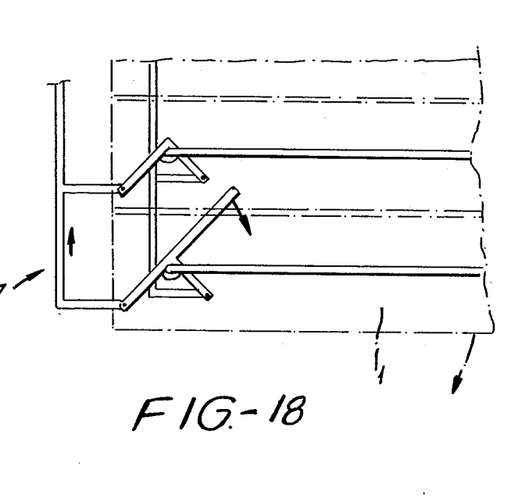
Figure 19:
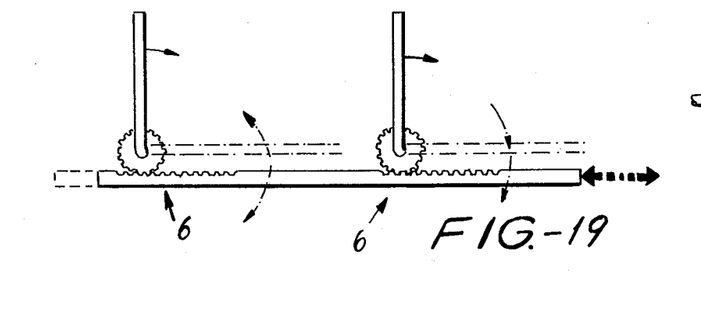
FIG. 19 shows an example of another possible configuration of said transmission of movements by the action of racks.

According to the drawings the convertible and reversible solar shed or ceiling of the present invention is essentially constituted by two parallel and aligned ranks of compound plates 1 which are pivoting and rotating around preferably vertical cylindrical bearings 2, said plates being rectangular in plant (FIG. 2) but having a profile which may be rectilinear (FIG. 3), polygonal or arcuated 1' (FIG. 11) "said plates being rectangular and plan (FIG. 2) and having an arcuated profile 1' (FIG. 11) and being placed two by two in face to face relationship at uniform and convenient spacements so as to cause full or partial coverage of the gap defined between the ranks. Each rank of plates 1 being controlled and coordinated by a rack device 6 (FIG. 19) or combined levers 7 (FIGS. 17 and 18) thereby allowing rotation of plates 1, 1' from 0° to 180° in each rank, that is:"

Figure 4:
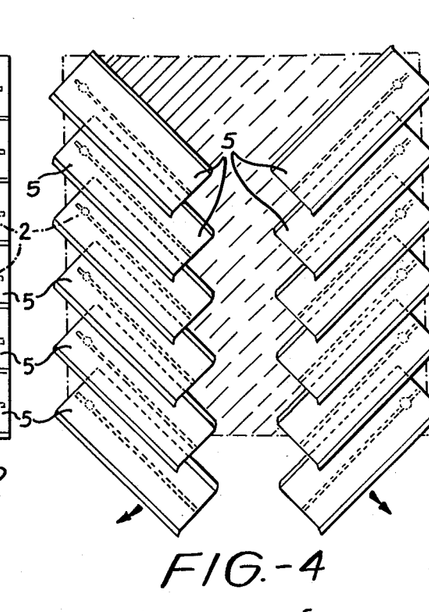
FIG. 4 is a plant view of said convertible and reversible solar shed or ceiling of the present invention in opening movement of its components.
Figure 5:
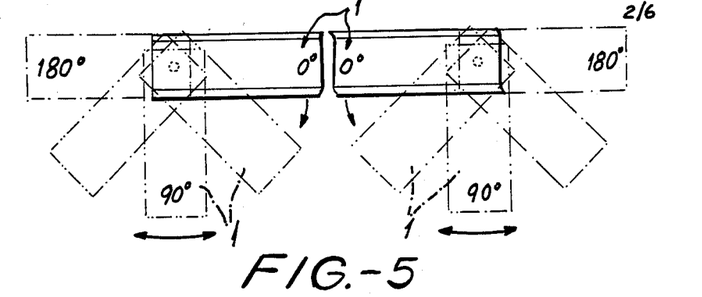
FIG. 5 is a plant view of a corresponding and facing pair of forming elements of the solar shed or ceiling of the present invention, and the possibilities of rotating movement thereof are shown in dotted lines.
Figure 6:
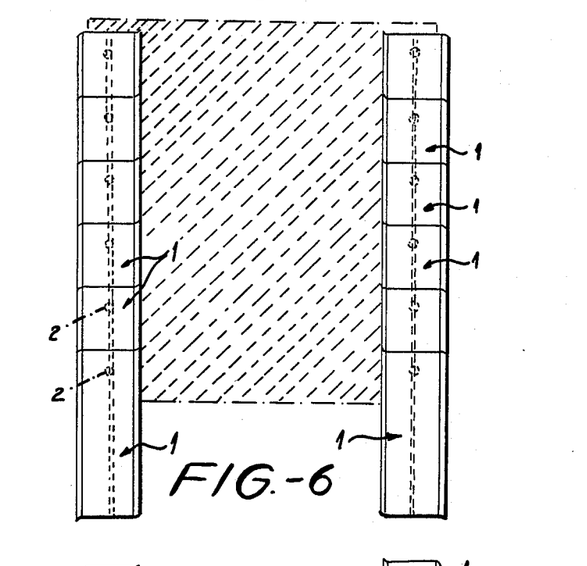
FIG. 6 is a plant view of the solar shed or ceiling of the present invention at its convertible condition by rotation of its components at 90° with almost full clearing of the internal gap.
Figure 7:
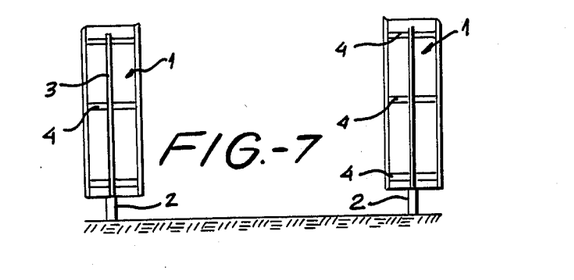
FIG. 7 is a frontal view of the solar shed or ceiling of the present invention under the same almost full convertible clearing condition of its internal gap as shown by FIG. 6.
Figure 8:
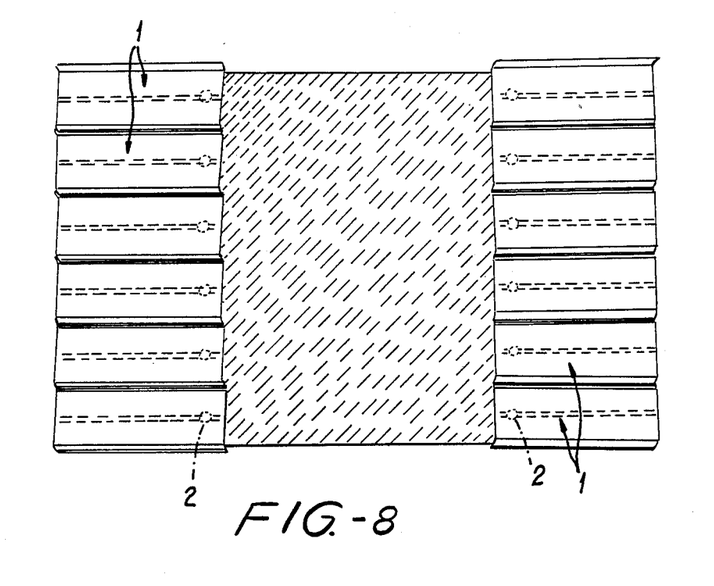
FIG. 8 is a plant view of the same solar shed or ceiling showing its reversible condition by rotation of its elements at 180° with full clearing of the internal gap; is a frontal view of the solar shed or ceiling of the present invention under the same reversible condition of full clearing of the internal gap shown by FIG. 8.
Figure 9:
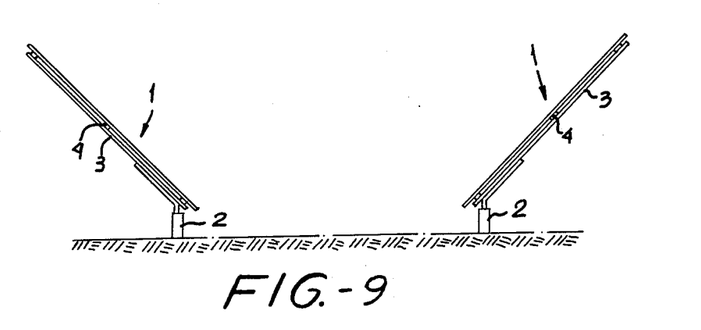
Figure 10:
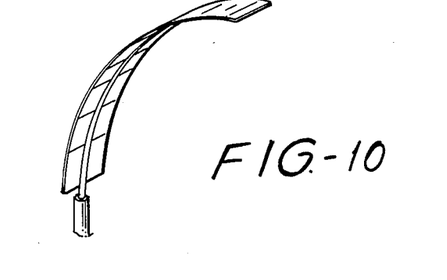
FIG. 10 is a perspective view of another embodiment of the components of the present convertible and reversible solar shed or ceiling.
Figures 13, 14, 15:
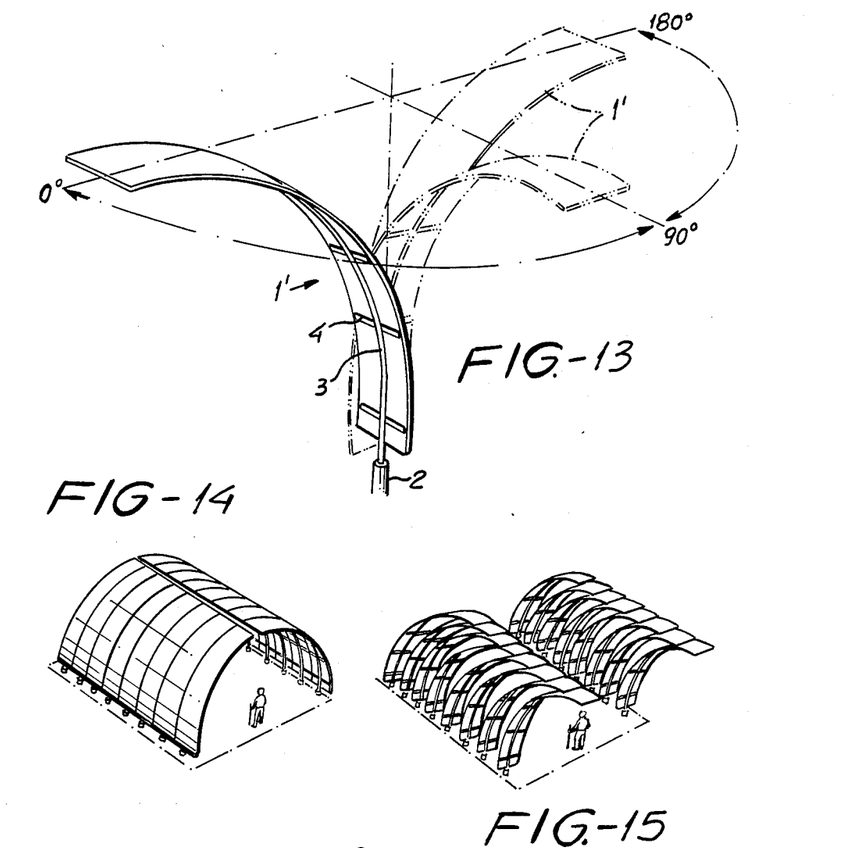
FIG. 13 is a perspective representation of one plate element of the present solar shed or ceiling showing the three positions possible under rotation around the axis and corresponding angles at 0°, 90° and 180°.
FIGS. 14, 15 and 16 show respective views of the solar shed or ceiling of FIG. 12 at corresponding rotating positions of its elements at respective angles of 0°, 90° and 180°.
Figure 16:
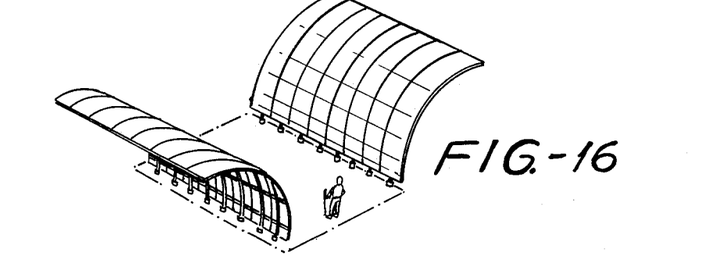

0° (closure condition)—the plates are in face relationship thereby closing the gap and touching themselves by their free ends and then closing the coverage and the internal area (FIGS. 2, 3, 11, 12 and 14);

90° (convertible condition)—the plates are parallel to the longitudinal direction of the rank and therefore causing the semi-aperture of the cover and the partial release of the internal area, but forming two lateral bulwarks of plates (FIGS. 6, 7, 15);

180° (reversible condition)—the plates are in opposition and therefore cause the complete opening of the coverage and full release of the internal area to the sunlight and to the other natural agents (FIGS. 8, 9, 16);

Between 0° and 180° the plates 1 may stop at any intermediary position (FIGS. 4, 5 and 13), each rank of plates 1 having its collective control and if necessary, both controls may be coordinated in a single one which may be manually or motor-driven.

The compound plates 1 have a substantially rectangular plant surface shape (FIGS. 1 to 9) or have a profile which is folded or arcuated (FIGS. 10 to 16) at convenient angles. Said plates are mounted on structures which are longitudinal thereto but which are converging to a spinal preferably tubular column 3. Such structures enable the plates to have a right, angular or arcuated shape and the mentioned spinal column receives fixed beams or supporting ribs 4 placed at convenient distances. Metallic or plastic, rigid or flexible covering materials 5 are fastened to said ribs by incasement or by any equivalent means. Such fastening follows the logitudinal profile of the spinal column.

As complementation the set includes cylindrical bearings 2 for effecting incasement of the bottom ends of said spinal column 3 being preferably vertical but pivoting so as rotation from 0° to 180° may occur free from gravity action. Said cylindrical bearings are located at horizontal bridges on the soil or over columns or directly over the supporting column of the spinal column (construction of roof).

Figure 20:
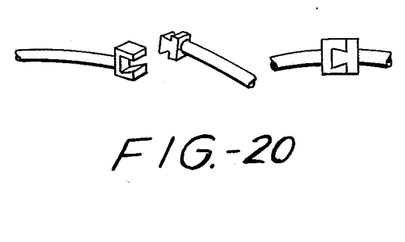
FIG. 20 shows an example of a possible configuration of the upper terminals of a facing pair of components of the shed for mutual incasement.

With further reference to the spinal column 3 of the plates which constitute the solar shed or ceiling of the present invention, same may be provided with upper terminals for mutual mortise 8 of the male-female type (FIG. 20) so as to be simultaneously locked at the closure position of the shed thereby offering sufficient resistance against wind.

On the other hand, besides being provided with upper terminals 8 of the spinal column 3 for mutual mortise, the shed may be provided with an upper ridge 9 (FIG. 4) being attached for example to the plates 1 of one of the ranks of the shed, and thus being superimposable to the facing rank or alternatively being formed in two halves, each one being attached to the plates of one of the ranks and being mutually incasable.

Figure 2A:
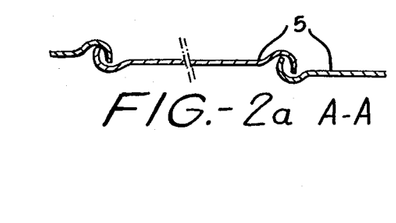
FIG. 2a is a sectional view along the line A—A of FIG. 2.

Plates 5 may be coated with aluminium or galvanized iron 5, diverse plastics armed or not, rigid or flexible as well as by canvas or equivalent materials which are fastenable and preferably by mortising the beams or supporting ribs 4 and being coupled to the edges so as to close the gap. Said coating 5 may still have lateral finishings of the male-female type (FIG. 2a) thereby allowing the successive mortise of the plates (overlaping) and then fully sealing the shed against rain, dust, insects and the like when deemed convenient.

The control lever for each rank of plates 1 which constitute the convertible and reversible solar shed or ceiling of the present invention may be actuated by hand or by a hydraulic piston or same may be replaced by a rack or endless moto-reducer.

The use of the convertible and reversible solar shed or ceiling constructed according to the teachings of the present invention, and as shown by the enclosed drawings provides for to the user a simple and light movement to cover or discover great areas, because the axis are vertical and therefore rotations of the plates are developed at the horizontal plan, and the weight is not transported. For this reason, one single operator may cover or discover for example a coffee drying area in ten seconds, thereby saving the grains from an eventual forthcoming storm. The normal operation would probably cause damages to the coffee. Therefore the mechanisms of the solar shed or ceiling of the present invention allow for the use of plates which may have giant dimensions, thereby saving one of the rarest and most expensive factors: hand labor.

Furthermore the user himself being for example a rich farmer may actuate the coverages by pressing buttons from the farm house.

With further reference to the possibilities of sofistication of the present invention sensor means sensible to higroscopy or to heat or wind may be used to close or open the solar shed when needed.

Further to the use in connection with the protection of agricultural cultures in general, the present convertible and reversible solar shed or ceiling may also be applied to sporting and leisure areas such as tennis courts, pools and the like.

In such cases, the closure position (at 0°) allows perfect use of the installation under unfavourable conditions of the weather, that is in case of rain, excessive wind and others.

Afterwards under favourable conditions the coverage may be open at 90° or 180°, and in this latter case the internal space becomes completely open to the sun, and at the same time barriers are formed to protect the place against eventual undesired winds.

Finally instead of providing the convertible and reversible solar shed or ceiling of the present invention with two parallel and aligned ranks of compound plates 1, same may include one rank of plates 1 only.

Said plates would face a wall or any vertical shield so as to form one half of the previous shed. The set would have however the same possibilities of rotation of the component plates and identical full closure, partial aperture or full clearing of the internal gap.

The coating of the plates may be transversally and longitudinally ondulated or corrugated with any configuration provided that the lateral superposition enables the incasement or combination.

I claim:

1. A convertible and reversible solar shed or ceiling, comprising:

two ranks of parallel and aligned compound plates (1, 1');

vertical bearings about which said compound plates are pivotable and rotatable;

said plates being rectangularly shaped and arcuately profiled and arranged in two by two, face to face relationship at uniform spacings to at least partially cover a gap therebetween and an area thereunder;

a rack device for controlling and coordinating each rank of plates (1, 1'), said rack device causing simultaneous actuation of said plates (1, 1'), so that said plates turn at 0° and at 180° in each rank, said plate being adapted to rotate at 0° resulting in said plates following each other thereby fully covering said gap and said area, said plates being adapted to rotate at 90° resulting in parallel arrangement of said plate with respect to a longitudinal direction of said rank thereby providing semi-aperture coverage and partial opening of said area, and forming two vertical walls of plates, said plates being adapted to rotate at 180° resulting in alignment of said plates opposite to each other to completely open said gap and said area to surrounding environmental conditions, said plates adapted to be placed at any intermediate point between 0° and 180°;

each rank of plates having a collective control and wherein all collective controls are connected to a single control to provide for instantaneous response by said plates.

2. A convertible and reversible solar shed or ceiling according to claim 1, wherein each plate (1) is mounted over a respective longitudinal structure such as a spinal column (3) having a tubular shape, thereby facilitating the arcuate shape of the plates, said spinal column (3) receiving fixed beams or supporting ribs (4) placed at convenient distances and to which coating materials of any kind are fastened by fastening means such as encasement means.

3. A convertible and reversible solar shed or ceiling according to claim 2, further including cylindrical bearings (2) incasing the lower ends of said spinal column (3) of the plates (1'), said bearings (2) pivoting to produce rotation from 0° to 180° free from gravity effect, and thus lighter to the operator; said cylindrical bearings (2) being located at horizontal bridges or over columns or directly over the supporting column of the spinal column (3).

4. A convertible and reversible solar shed or ceiling according to claim 1, further including a control device for each rank of plates (1, 1') which is actuated by a moto-reducer or endless rank.

5. A convertible and reversible solar shed or ceiling according to claim 1, wherein each plate (1') is arcuated and has a rectangular shape, being mounted over a respective longitudinal structure or longitudinal spinal column (3) having a tubular shape, supporting beams (4) attached to said spinal column (3) and placed at convenient distances to which the plates (1') are fastened by incasement or by other means, said plates (1') receiving any suitable coating (5) longitudinally following the profile of the spinal column (3).

6. according to claim 1, characterized in that plates (1, 1') include; lateral finishings of the male-female type to allow successive mortise of the plates (1) at the initial and final positions so as to fully seal the shed against rain, dust, insects or the like.

* * * * *